R. HANCE.
Harvester.
No. 36,460. Patented Sept. 16, 1862.
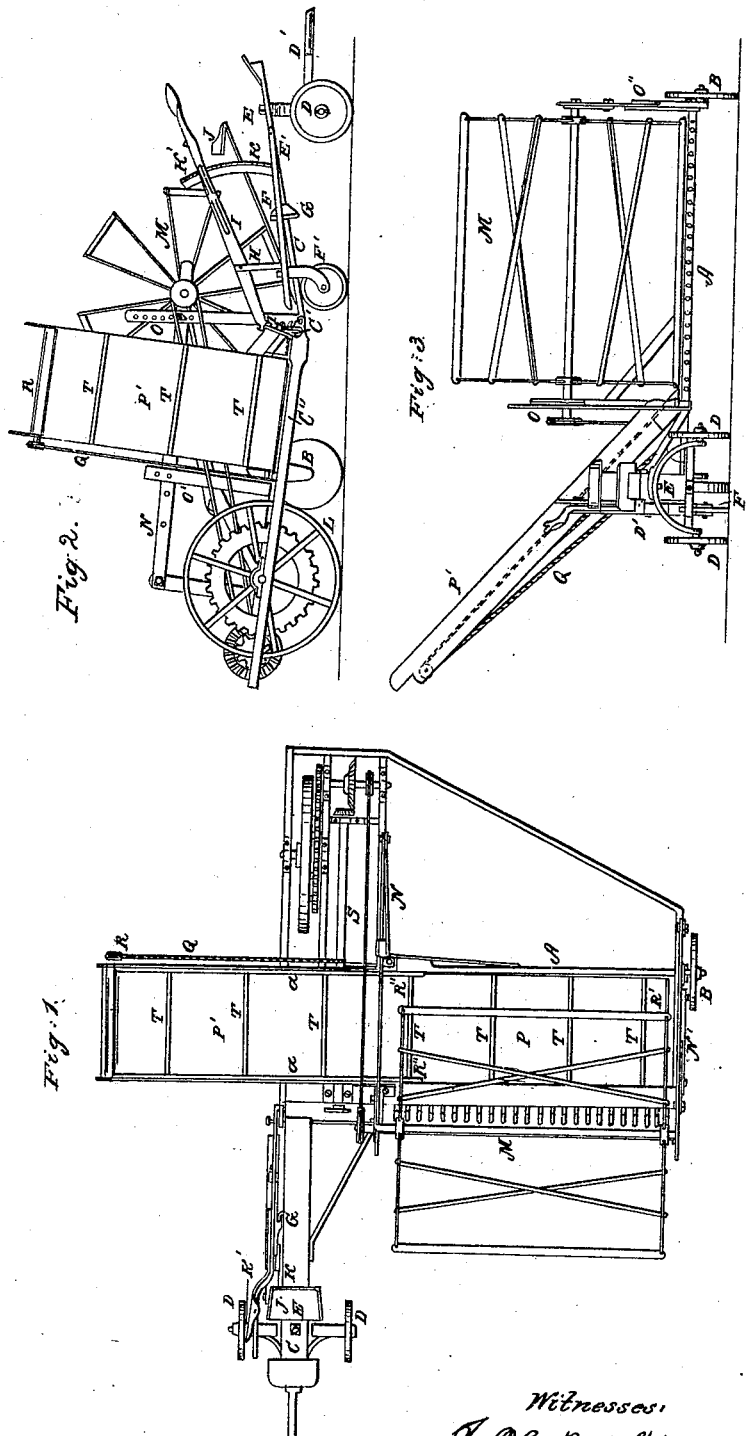
Witnesses:
J. H. Buttolph
A. J. Van Dyke
Inventor.
Royal Hance

UNITED STATES PATENT OFFICE.

ROYAL HANCE, OF PECATONICA, ILLINOIS.

IMPROVEMENT IN HARVESTERS.

Specification forming part of Letters Patent No. 36,460, dated September 16, 1862.

*To all whom it may concern:*

Be it known that I, ROYAL HANCE, of Pecatonica, in the county of Winnebago and State of Illinois, have invented new and useful Improvements in Harvesters; and I do hereby declare that the following is a full and complete description of the construction and operation of the same, reference being had to the accompanying drawings, making part of this specification, in which—

Figure 1 is a top view. Fig. 2 is a side view. Fig. 3 is a front view.

Like letters refer to like parts.

The nature of my invention relates, first, to the mode of raising the cutter-bar; second, to the mode of hanging the reel.

A is the cutter-bar frame.

B is a bearing-wheel upon the outer end and back corner of the cutter-bar frame.

C is the draw-bar, which is hinged to the inner end and forward part of the machine and cutter-bar frame at C'.

D D is pair of truck-wheels, which support the forward end of the draw-bar, to which the axle-tree D' is secured by a king-bolt, E.

F is a fulcrum-lever, the forward end of which is secured to the outside of the forward end of the draw-bar, just back of the king-bolt E at E'. The back end of this lever F is supported by a fulcrum-wheel, F', the bearing of which is pivoted to the lever by means of a crooked shank, in such a manner that it adjusts itself to the line of draft. The fulcrum-lever is kept in place by a sliding catch and segment, G, Fig. 2, which allows of a free vertical motion, but not a lateral one.

H, Fig. 2, represents a fulcrum-post, which rests upon and is secured to the lever F nearly above the fulcrum-wheel.

I represents a lever, which is pivoted to the post H, the short arm of which extends back to a point vertical to the articulation of the draw-bar with the frame of the machine. The lever I is here connected with the frame by a chain and hook, as seen at I'. The long arm of the lever I extends a little forward of the seat of the driver, which is seen at J. The lever is thus constantly in a position to be reached by the driver, and it can be elevated or depressed at pleasure, and secured in any desired position by means of the segmental ratchet K and pawl K'. The back part of the frame C" being supported by the driving-wheel L, and the outer end of the cutter-bar frame being supported by the wheel B, it follows that if the lever I is depressed the forward part of the cutter-bar frame and cutters will be raised, and by elevating the lever the cutter-bar and cutters will be depressed, so that by this means the cutters can be brought close to the ground or be raised above it, thus having a range of two feet or more. The cutter-bar is thus completely under the control of the driver.

M represents the reel. This is supported at each end by an adjustable frame-work, N N', by means of which the reel can be raised or lowered or placed in an oblique position to the cutter-bar. It can be secured in any desired position by introducing bolts into holes in the standards O O', Fig. 2, and into the curved bar O" in Fig. 3. The standards O' and O" are rigidly attached to the frame of the machine, while the standards O and O''' are pivoted to the frame by a pin-joint. The horizontal bars N N' are in like manner pivoted to the standards O O''' at or near their top, as seen in Figs. 1, 2, and 3, so that the bars N N', to which the forward ends of the reel are attached, can be moved forward or backward, or up or down, by changing the bolts in the standards O', O, and O". The necessity for these changes in the position of the reel is dependent upon the direction of the wind or the inclination of the grain. The position of the reel may therefore need changing in crossing the field in different directions.

P represents the platform upon which the cut grain falls, and P' is an inclined table or elevator connected therewith. Both the platform P and inclined table P' are provided with an endless apron, which embraces both platform and inclined table. The apron is caused to revolve by means of the band Q, which passes around the pulley on the roller R of the endless apron, and a groove in the crank-shaft S, Fig. 1. At the outer end of the platform the endless apron passes around a roller, R, Fig. 1. At the angle R" the apron is prevented from rising by passing under the ways or guides *a a*, as seen in Fig. 1.

T, Figs. 1 and 2, represent cleats fastened to the endless apron that covers the platform P and inclined table P'. These carry the cut grain to the top of the inclined table, and as the apron revolves the grain is deposited in gavels outside of the track of the machine. Were it not for these cleats or their equivalent, the grain would not be carried up the inclined table P', for it would all slide down to the angle R''; but with them it will all be carried up in bunches, as before described.

What I claim as my improvement, and desire to secure by Letters Patent, is—

1. The fulcrum-lever F, fulcrum-wheel F', fulcrum-post H, and lever I, in combination with the draw-bar C, machine-frame C', and platform-frame A, arranged and operating as and for the purpose specified.

2. The adjustable frame N N', the standards O O', and curved bar O'', when arranged as and for the purpose specified.

ROYAL HANCE.

Witnesses:
J. H. BUTTOLPH,
A. S. VAN DYKE.